(12) United States Patent
Hrabal

(10) Patent No.: US 10,723,184 B2
(45) Date of Patent: Jul. 28, 2020

(54) CHAMBER OF A PERISTALTIC PUMP FOR TIRE PRESSURE ADJUSTMENT

(75) Inventor: Frantisek Hrabal, Prague (CZ)

(73) Assignee: CODA Innovations s.r.o., Prague (CZ)

( * ) Notice: Subject to any disclaimer, the term of this patent is extended or adjusted under 35 U.S.C. 154(b) by 0 days.

(21) Appl. No.: 13/399,038

(22) Filed: Feb. 17, 2012

(65) Prior Publication Data

US 2012/0211137 A1    Aug. 23, 2012

Related U.S. Application Data

(63) Continuation of application No. 12/302,027, filed as application No. PCT/CZ2007/000035 on May 23, 2007, now abandoned.

(30) Foreign Application Priority Data

May 23, 2006  (CZ) ..................... 2006-335

(51) Int. Cl.
 B60C 23/12  (2006.01)
 B60C 15/06  (2006.01)
(52) U.S. Cl.
 CPC .............. B60C 23/12 (2013.01); B60C 15/06 (2013.01)
(58) Field of Classification Search
 CPC .................................. B60C 23/10; B60C 23/12
 USPC .......... 152/329, 339.1, 340.1, 415, 418–419, 152/423–426; 156/113, 118–120
 See application file for complete search history.

(56) References Cited

U.S. PATENT DOCUMENTS

| 586,352 A | * | 7/1897 | Chamberlain | 152/511 |
| 598,108 A | * | 2/1898 | McCollum | 152/426 |
| 638,628 A | * | 12/1899 | Everett et al. | 152/425 |
| 655,932 A | | 8/1900 | Laviers | |
| 706,021 A | | 8/1902 | Claesgens et al. | |
| 1,050,886 A | * | 1/1913 | Wetherell | 152/426 |

(Continued)

FOREIGN PATENT DOCUMENTS

| DE | 2632622 A1 | 2/1977 |
| DE | 3433318 | 3/1986 |

(Continued)

OTHER PUBLICATIONS

Notice of Opposition (Oct. 5, 2015) in corresponding European App. EP07721824.6.

(Continued)

*Primary Examiner* — Jason R Bellinger
(74) *Attorney, Agent, or Firm* — WRB-IP LLP

(57) ABSTRACT

A chamber is provided that works as a peristaltic pump for the pressure correction in the tire, which is a part of the tire or of an ancillary structure placed between the rim and the tire bead and is connected with the tire internal space at one end and with the external environment at the other end. The chamber is in the shape of a curved hollow channel, where at least one enclosing wall is at least partially formed by at least a pair of surfaces coplanar with the longitudinal direction of the chamber. When the tire is mounted on the rim, the pair of surfaces are pressed together thus hermetically closing the chamber. When the chamber is closed during rotation of the wheel, the surfaces can slightly slide on one another taking internal wall tensions onto themselves thus decreasing the possibility of wall damage through ripping.

75 Claims, 8 Drawing Sheets

(56) References Cited

U.S. PATENT DOCUMENTS

| | | | | |
|---|---|---|---|---|
| 1,134,361 | A | * | 4/1915 | Wetherell ............... 152/426 |
| 1,163,219 | A | | 12/1915 | Cleaver |
| 1,237,131 | A | * | 8/1917 | Welch ............... 156/120 |
| 1,250,223 | A | * | 12/1917 | Rawdon ............... 152/426 |
| 1,348,111 | A | | 7/1920 | Hayford |
| 2,021,646 | A | | 11/1935 | Crandall |
| 2,095,489 | A | | 10/1937 | Cotton |
| 3,304,981 | A | * | 2/1967 | Sheppard ............... 152/426 |
| 4,169,497 | A | | 10/1979 | Tsuruta |
| 4,651,792 | A | | 3/1987 | Taylor |
| 4,922,984 | A | * | 5/1990 | Dosjoub et al. ............... 152/415 |
| 7,117,731 | B2 | | 10/2006 | Hrabal |
| 7,225,845 | B2 | * | 6/2007 | Ellmann ............... 152/426 |
| 7,322,392 | B2 | | 1/2008 | Hawes |
| 8,113,254 | B2 | | 2/2012 | Benedict |
| 8,186,402 | B2 | | 5/2012 | Eigenbrode |
| 8,344,868 | B2 | | 1/2013 | Browne et al. |
| 8,381,784 | B2 | | 2/2013 | Delgado |
| 8,381,785 | B2 | | 2/2013 | Losey |
| 8,534,335 | B2 | | 9/2013 | Benedict |
| 8,573,270 | B2 | | 11/2013 | Hinque |
| 8,651,155 | B2 | | 2/2014 | Hinque |
| 8,662,127 | B2 | | 3/2014 | Hinque |
| 8,701,726 | B2 | | 4/2014 | Hinque |
| 8,857,484 | B2 | | 10/2014 | Hinque |
| 9,061,556 | B2 | | 6/2015 | Hinque |
| 9,126,462 | B2 | | 9/2015 | Hinque |
| 9,381,780 | B2 | | 7/2016 | Hinque |
| 2004/0112495 | A1 | | 6/2004 | Weise |
| 2005/0126273 | A1 | | 6/2005 | Hrabal |
| 2006/0021690 | A1 | | 2/2006 | Bunker |
| 2006/0118224 | A1 | | 6/2006 | Ellmann |
| 2009/0044891 | A1 | | 2/2009 | Lee |
| 2009/0294006 | A1 | * | 12/2009 | Hrabal ............... 152/426 |
| 2010/0243121 | A1 | | 9/2010 | Eigenbrode |
| 2011/0272073 | A1 | | 11/2011 | Losey |
| 2016/0046159 | A1 | | 2/2016 | Lin |

FOREIGN PATENT DOCUMENTS

| | | |
|---|---|---|
| DE | 4323835 A1 | 1/1995 |
| DE | 10255167 | 1/2004 |
| RU | 2106978 C1 | 3/1996 |
| SE | 183890 A1 | 5/1963 |
| WO | 03049958 | 6/2003 |
| WO | 2005012009 | 2/2005 |
| WO | 2007134556 | 11/2007 |
| WO | 2009103252 | 8/2009 |
| WO | 2011057591 | 5/2011 |
| WO | 2013009583 | 1/2013 |

OTHER PUBLICATIONS

Grounds for Appeal in Appeal Proceedings T0155/18-3.2.01, Opponent The Goodyear Tire & Rubber Company, dated Mar. 21, 2018.
Response in Appeal Proceedings T0155/18-3.2.01, by CODA Innovations s.r.o., dated Aug. 6, 2018.
Communication of the Board of Appeals pursuant to Article 15(1) in Appeal Proceedings T0155/18-3.2.01, dated Oct. 18, 2019.
Response to Communication of the Board of Appeals in Appeal Proceedings T0155/18.3.2.01, by CODA Innovations s.r.o., dated Dec. 3, 2019.
Response to Communication of the Board of Appeals in Appeal Proceedings T0155/18.3.2.01, by The Goodyear Tire & Rubber Company, Dec. 12, 2019.
Official Action (Nov. 8, 2019) from Intellection Property Office of Singapore.
Decision of Technical Board of Appeal, dated Feb. 25, 2020.

* cited by examiner

CHAMBER OF A PERISTALTIC PUMP FOR TIRE PRESSURE ADJUSTMENT

The present application is a continuation of U.S. application Ser. No. 12/302,027, filed Nov. 24, 2008, which is the U.S. national stage of International Application PCT/CZ2007/000035, filed May 23, 2007, which claims priority to Czech Republic App. PV 2006-335, filed May 23, 2006, all of which are incorporated by reference.

The invention regards, in an aspect thereof, a tire arrangement comprising a tire and a chamber formed by a component with shape memory for tire pressure adjustment, which component is a part of the tire or is adjacent to the tire wall and the chamber is connected with the tire internal space at one end and with the exterior or ambient environment at the other end. For ease of discussion, the combination of the tire and component defining a chamber will be generially referred to herein as a "chamber", except where otherwise indicated. Another aspect of the invention concerns the production method of the chamber and tire and rim with this chamber.

Different solutions for pressure maintenance in the tire under operation are used in technical practice. These are for example tires fitted with an air intake, connected to an external source of pressurized air. The drawback of these solutions are high costs and complexity of the devices.

There are also self-inflating tires. For example, the model type of a self-inflating tire is described in pending patents CZ PV 2002-1364 and CZ PV 2001-4451. The air feed chamber is located in the tire wall or adjacent to it. The chamber is periodically completely compressed or broken, with progressive rolling deformation across the tire chamber, the advancing compression of the chamber to the zero cross-section area forces the medium contained in the chamber forward, thus creating vacuum behind. The chamber in the shape of a hose placed in the tire wall or in its vicinity along the tire perimeter works as a peristaltic pump.

During tire manufacture, the individual layers of various components are applied in the form of flat material onto the revolving building drum. Components are then expanded and shaped by pressure applied from the interior side to a ring-shaped arrangement.

The pressure is usually provided and directed by a bladder described for instance in CZ patent 246152, defining the center bladder of the building drum for tire building and use of such bladders.

Following pressure forming, the raw rubber tire is removed from the building drum and inserted into the forming and vulcanizing mold in the shape of the finished tire. The mold is sealed and heated. The raw rubber tire is radially expanded in the outward direction up to the mold perimeter, through injection of the power fluid into the hardening bladder mounted inside the mold and placed inside the mold. The hardening bladder expands, it pushes the tread and the side walls of the raw tire into the mold heated walls. Upon this vulcanization, the individual layers are joined together and the tire gets its final shape and hardness.

The tire re-treading is performed in a similar way.

The bladder function is for example described in CZ patent 273325 "Mobile unit for vulcanization of tire-casings" where the unit consists of two-piece mold, halves of which can be joined to form a ring-shaped chamber for holding the non-vulcanized casing. One of both halves of the mold contains a closed circuit for the pressure vulcanization medium. The closed circuit includes the interior of the bladder, which is squeezed into the ring-shaped chamber, and housing connected to the heated feeding channels and return channels. The bladder is made of elastomer, it is of the C-shape and expands inside the ring-shaped chamber, thus pressing on the inner surface of the non-vulcanized raw casing.

The CZ patent 246152 defines the center bladder of the building drum of the machine for tire casing building and use of such bladders, which serve as curing membranes for most building drum types. They have the role of an active element in reshaping the originally manufactured drum-shaped tire casing semi-finished product to the toroidal shape.

To clarify some of the new production methods of tire chamber-type, it is necessary to mention the design of the tubeless tire and rim assembly and the behavior of this assembly in operation. In general, the tubeless tire has the C-shape. After the tire is fitted onto the rim and inflated, the tire walls expand in the direction of the rotation axis and in the bead area they press against the rim walls, which makes the inflated tire seal. The hermetically closed assembly then consists of the tire side walls, the tire tread part, and the rim.

Disadvantages of these designs are high production costs, worse operation and mounting of the chamber and the related components into the wheel assembly, very high risk of breakage, crumbling and abrasion of the chamber walls in their compressing, and thus shortened chamber life expectancy as well as reduced tire safety. In case of forces applied on the chamber against the direction of the chamber closing, which can be quite common during the chamber function, its wall can be ripped. Another disadvantage is difficult or unsolved joining of the individual chamber components; then the need for fundamental modifications in the tire chamber-type manufacturing method, and especially the fundamental modifications of the production machinery. Yet another disadvantage is the need to produce a basically complete unique chamber assembly for each tire type and pressure. And finally, with respect to a relatively small space, which is available for the chamber installation, the chamber will have a relatively small working volume and output.

The above mentioned draw backs are significantly eliminated by the use of the chamber with shape memory for the tire pressure correction in the tire, which is a part of the tire or is adjacent to the tire wall and is connected with the inside space of the tire at one end and with the outer environment at the other end, according to this invention. The core of this invention is that the chamber has the shape of the curved hollow channel, where at least one its enclosing wall is formed by at least a part of the pair of surfaces coplanar with the longitudinal direction of the chamber and at the angle $\alpha=0$ to $120°$. If the angle is $\alpha>0°$ it is on the connecting edge of these surfaces, located on the remote side from the center of the transverse chamber cross-section.

The chamber has an advantage of being at least partly ring-shaped, or at least partly toroidal, or at least partly helical. The chamber can be located in the space of the tire sidewall, at its bead; or it can be located in an ancillary structure inserted between the tire sidewall and at least one component of the assembly consisting of the rim, hub-cap, or support. In the efficient design, the ancillary structure with chamber is firmly connected to the rim or hub-cap, or with the tire sidewall. The ancillary structure containing the chamber is efficiently shaped for tight fitting with the tire sidewall from one side and shaped for fitting with the rim from the other side.

Then the invention regards the production method of the above stated chamber. In this method, a usually flat matrix is inserted between the layers forming the tire sidewall before vulcanization, with the width of 0.1 to 200 mm and thickness of 0.01 to 100 mm. Then vulcanization is performed and the inserted matrix is removed in one piece, or in parts. In the efficient design, the matrix thickness is increased in the direction from the center axis.

After vulcanization, the matrix is removed and a member with the cross-section identical to the chamber cross-section at the place of location of the member inside the chamber is inserted into the formed slot with the U-shaped cross-section opening towards the center axis. After fitting the tire onto the rim, all the chamber wall surfaces will take the working position and the slot walls will touch each other in their respective parts and the chamber cross-section will correspond to the required chamber cross-section before loading. In the effective design the member is, at least at one end, fitted with a channel, which opens at the face of the chamber and leads into the free space outside the tire, or outside the ancillary structure.

The matrix is effectively divided into at least two parts, where the first part corresponds with the chamber length and is removed after vulcanization. The second (additional) part of the matrix remains in the tire, while an incompressible channel is effectively formed in the additional part at least at one end, and this leads to one of the faces of the chamber ends and its other side leads into the empty space inside the tire or outside the tire.

The chamber can be effectively formed also by the matrix circumscribing only a part of the circle of the tire or ancillary structure.

The ancillary structure with the chamber, or the chamber in the tire wall, respectively can be formed by sticking of two strips of material together, where at least in one of the strips at least a part of the chamber will be pressed out, ground out, milled out, machined, cut out, melted off, or burned out. The chamber in the ancillary structure formed in only one strip of material or the tire wall, respectively can also be made by pressing out, grinding out, milling out, machining, cutting out, melting off, or burning out, or the whole ancillary structure can be extruded in a similar way to producing sealing, hoses, etc.

The invention also concerns the tire or rim with a wall that is fitted with a profile for the fitting with of the ancillary structure.

The advantage of the chamber is that the chamber walls, formed by the pair of surfaces under a small angle, are subjected to relatively small forces upon the chamber deformation. This decreases the possibility of wall damage, for example through ripping or breaking as a result of internal tension under load.

The pair of surfaces can continue outside the chamber under the angle of 0 degrees. These surfaces, pressed together, take the internal wall tension onto themselves in a smaller extent. If the wall was not formed by partly parallel surfaces a higher mutual transmission of forces would occur. On the other hand, with parallel surfaces, the internal forces within the chamber wall will be much simpler and less interacting.

The walls diverge or open towards the inside of the chamber. If there is a temporary need for the surfaces to open in a further distance from the chamber cross-section center upon the chamber deformation, the point of opening can move to the place of the original parallel surfaces. However, if the surfaces were firmly joined in the original place of opening and they did not continue in parallel outside the chamber, a ripping could occur in this point. The option of moving the point of opening thus provides lower strength stress of the chamber walls during different loading of the tire and chamber.

The opposite chamber walls can have a different cross-section length. Nonetheless, it is necessary that they hermetically fit on each other under the load and their cross-section lengths were sized up at the same time. This can be achieved by transverse compression of the wall with a longer cross-section, or by transverse stretching the wall with a shorter cross-section, respectively. Compression or stretching of the walls is limited by their compressibility, or expandability of the wall material. However, if the wall with a longer cross-section is formed by two surfaces making an angle of 0 to 120 degrees and the vertex of the angle will be located, for example, in the center of the cross-section of this wall then this wall will change its cross-section length easier when subjected to load. Since the place of the chamber location as well as material qualities are limited this folded arrangement will allow maximization of the chamber volume also in the given limited conditions, even in the limited space.

The chamber walls with different lengths will have a tendency to shift over each other when under the load. The folded arrangement will reduce this tendency, the chamber will fold to its final closed shape under the load and the opposite walls will become almost parallel just before their mutual contact. Under this arrangement at the same time, the chamber walls are subjected to forces generally perpendicular to the chamber walls. Thus, their orientation closes the chamber, which is the required state, and also does not act in parallel with the chamber wall in such a great extent, which would be an undesirable state, because the walls would shift over each other. The sliding of the walls on each other causes their abrasion and destruction, which can lead to the tightness failure or the increase in volume of a part of the chamber, and thus to the change in the output pressure. With a regular passenger vehicle tire, there are about 500 revolutions per kilometer, or 5 million revolutions per every 10 thousand kilometers. This is why it is necessary to minimize any causes of a possible defect.

The chamber is effectively at least partly ring-shaped or toroidal-shaped, or at least partly helical-shaped because these shapes can be easily manufactured and help to achieve the required effects. The chamber is effectively placed in the area of the tire side wall at its bead because here is enough room for its placement. The chamber can be easily connected to the air inlet and outlet and all the chamber parts, including the valve, are close to the rim where they are subjected to the lowest centrifugal forces within the tire and thus it is easier to balance the tire. The bead area is one of the most rigid places in the tire and therefore the tire here behaves very predictably over the rotation cycle and it has the lowest deviations from the set point and expected state and it is one of the most protected places from wear and tear in the tire here.

The chamber can be placed in the ancillary structure, which is inserted between the tire side wall and at least one part from the following: the rim, hubcap, or support. This design allows the use of the regular contemporary tire and the overall contemporary wheel design; it is also possible to fasten the ancillary structure together with the rim or hubcap or tire side wall, which reduces the danger of its shifting or loss.

The matrix used to create the chamber can be pulled out of the chamber using the parallel surfaces of the chamber wall. If the surfaces continue through the tire wall out of the tire, as well as the matrix between them, it is possible to pull out the matrix between them out of the space formed by the matrix. For easier matrix extraction, these surfaces may be pulled apart temporarily. After fitting the tire onto the rim, all the chamber wall surfaces will take up a functional position and the chamber cross-section will correspond to the desired chamber cross-section before applying a load. The forces commonly present between the tire and the rim are therefore effectively used to ensure the required shape of the chamber and to seal all the sealing surfaces.

Even in the case when the chamber wall surfaces continue in parallel outside the chamber, though not outside the tire, or in the case that a thin and bendable, or flexible, matrix is used the extraction of the matrix after the vulcanization will be easier. By applying pressure on the chamber in parallel with the extension of chamber walls, or by applying pull on the chamber walls across the chamber walls, the chamber walls will get apart from each other in the direction of the pull and will not adjoin to most of the outer matrix surface. Thus they will not create considerable resistance against the extraction of the matrix out of the chamber lengthwise. However, the condition is that the matrix ripples or bends in its part creating the foot print of the parallel surfaces and thus allows the chamber to get contracted in this direction.

Effectively, the matrix can be bendable, e.g. rubber coated, fabric. Such material is bendable, but just a little compressible, which ensures the required shape of the foot print of the matrix. The bendable matrix can then be very easily extractable since it shrugs and avoids obstructions on its own when being extracted.

In the tire manufacture, the parallel surfaces enable the production of the chamber by a simple design change of the vulcanizing mold, commonly used in tire production. The chamber production matrix is attached to the vulcanizing mold and the matrix is then removed along with the vulcanization mold after the vulcanization of the tire. It is a relatively inexpensive and technically simple change, which will ensure the creation of a full-fledged chamber after fitting the tire on the rim. The chamber production matrix can also be inserted between the tire layers separately, before the tire is inserted into the vulcanizing mold and removed after the tire is taken out of the mold. The matrix can also be placed on the tire layers and subsequently covered by a layer of material and then vulcanized.

The chamber created between the tire and rim, or support mounted on the rim, takes the full advantage of the force arising between the tire and rim upon the tire deformation. In order to utilize the forces, which act these days in the tire wall above the bead in the point where the tire is not touching the rim any more, but is coming close to it periodically, it is possible to create a lug boss on the tire wall, which will fill up this room and uses the forces caused by the tire coming close to the rim to close the within contained chamber. If this lug boss is produced together with the tire it is again a simple change in design. The lug boss can also be replaced by an ancillary structure inserted between the tire and the rim.

Moreover, the lug boss or ancillary structure can increase the rigidity of the tire side wall, which is positive. Efficiently, it can be created at both beads of the tire, even if only one of them will contain the functional chamber in. Such placement at both beads will ensure the bilaterally symmetrical rigidity of the tire.

The tire walls are subjected to significant heat stress; the tire bead ambience is among the exposed places. Periodical airflow inside the chamber will ensure increase in heat dissipation off the tire wall.

Since a flat matrix with a width of 0.1 to 200 mm and thickness of 0.01 to 100 mm and efficiently fitted with a shaped protrusion will be inserted between the layers comprising the side wall of the tire or ancillary structure before vulcanization, the matrix can be easily removed after vulcanization, while the required profile will remain impressed in the material. The matrix can be extracted in parts, which makes its extraction easier, or as a whole, where it is possible to use the matrix repeatedly without the need to realign its individual parts every time. The extraction of the matrix can go easier even if the matrix thickness is changing offward the center axis.

If the wall of the tire and rim is equipped with a profile for fitting tight of the ancillary structure already in their production then the placement of this ancillary structure will be correct and fixed.

The chamber made in this way —if placed at the bead part near the rim —allows the connection with the more robust parts interconnecting the chamber with the tire and exterior environment. For example, the use of a larger valve allows its higher fineness and/or fitting of the valve with more features such as mechanical or electronic communication with other devices, status indication to the driver, air relief from the tire, and so on. The valve can be mounted directly onto the rim and thus it will not directly burden the structure of the tire. The closer the whole structure is to the wheel axis, the more massive it can be, and the less it will burden the wheel by its centrifugal forces. The interconnection of the chamber with its other parts created between the rim and the tire or ancillary structure, or partial creation of a part of the chamber within the tire or ancillary structure and the rest of the chamber, e.g. in the rim or between the rim and the tire, allows simple interconnection of these parts and their sealing by fitting the tire on the rim and the pressure between the tire and the rim. The formation of the incompressible channels allows to create not only the interconnection of the individual parts of the chamber but directly the incompressible channels can make a part of the chamber non-deformable to zero cross-section area of the chamber. Creating of a part of the chamber within the tire or ancillary structure and another part of the chamber outside them allows to form the chamber in a modular way, where the individual elements are standardized and usable e.g. for different tire sizes. In this way, it is, for example, possible to form a chamber within the tire with an exactly defined interior volume of the chamber and to define the resulting inflating pressure of the chamber by the volume of the non-deformable channels formed within the rim, with their volume corresponding to the inflating pressure required for the particular vehicle using these rims. The chamber can then be formed universally for different tire sizes and different inflating pressures while it is fine-tuned using suitable follow-up parts of the chamber for specific requirements.

Approximately a half of the vehicles on the roads have at least one tire underinflated by more than 20 percent, which is considered as highly risky. An underinflated tire can keep track worse and overheats, which leads to its rapid wear and tear, and thus to the loss of grip, or even to its explosion. Besides these safety risks, the economic side is important too. An underinflated tire has shorter operating life and higher rolling resistance, which shows by increased fuel consumption of the vehicle. Since drivers generally tend to overlook this risk and do not deal with it, self-inflation will have great safety and economic impacts.

In order to give a general idea of the function of the self-inflating tire chamber not only under this patent, a description of the general fundamental principles of its function will follow. A longitudinal chamber, e.g. of a rectangular cross-section of 1 times 3 millimeters, is formed in the tire 4. The tire gets compressed at the contact point of the tread and road and this deformation spreads through the tire approx. towards the tire axis up to the bead or to the rim, respectively. The chamber is formed diagonally to this deformation and therefore the deformation closes the chamber diagonally and the cross section of the closed chamber is O times 3 millimeters. The chamber has a zero cross-section area of the chamber at the point of the diagonal closing; it is blind. While the tire is rolling along the road surface the point of deformation moves along the tire circumference and the point of the diagonal closing of the chamber moves as well gradually and pushes the air compressed in the chamber ahead, while a vacuum is formed behind the deformation point within the chamber.

Based on the above mentioned principle, there are several alternatives of the chamber, which vary in the number and type of the valves used and the method of controlling the output or the maximum pressure of the chamber. For example, in the, chamber using at least one valve the output pressure or the maximum pressure can be set by creating a chamber with a fully-deformable part and fully non-deformable part, where both of these parts have defined maximum and minimum internal volume. The output pressure or the maximum pressure in the chamber is then defined by the ratio of the maximum volume of the chamber parts at the start of the cycle to the minimum internal volume at the end of the cycle.

Different tires have different dimensions. Just for illustration, a common tire size R13 has the contact area of its bottom part and rim about 12 mm wide and the contact area of its side part and rim about 7 mm high. Such a common tire for a passenger vehicle can get closer to the rim with its side wall at the upper part of its rim wall by tenths of millimeter and on the outer side of the tire above the contact area of a contemporary tire and rim in the matter of millimeters when rolling off. These dimensions then define the size of the unloaded chamber created at the tire bead in the matter of tenths of millimeters to millimeters. If the design of the common tire was changed it would be possible to increase this span.

For tires for trucks and special machinery these spans can then be reasonably higher depending on the size and design of these tires.

BRIEF DESCRIPTION OF DRAWINGS

The chamber with shape memory for tire pressure correction according to this invention will be described in detail using particular examples of design with the help of drawings attached.

FIGS. 4A and 4B show the section through the tire and FIGS. 4C and 4D show the tire in the front view.

DETAILED DESCRIPTION

Figure 1A:
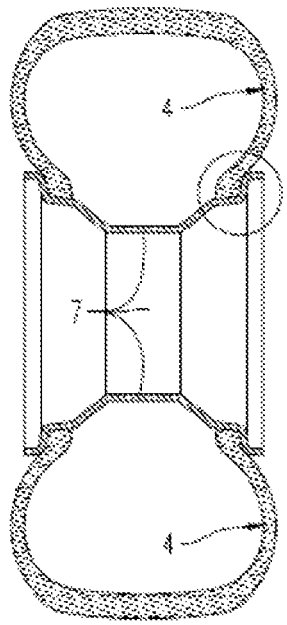
FIG. 1A shows the sectional view of the tire and FIG. 1B shows in the front view.
Figure 1B:
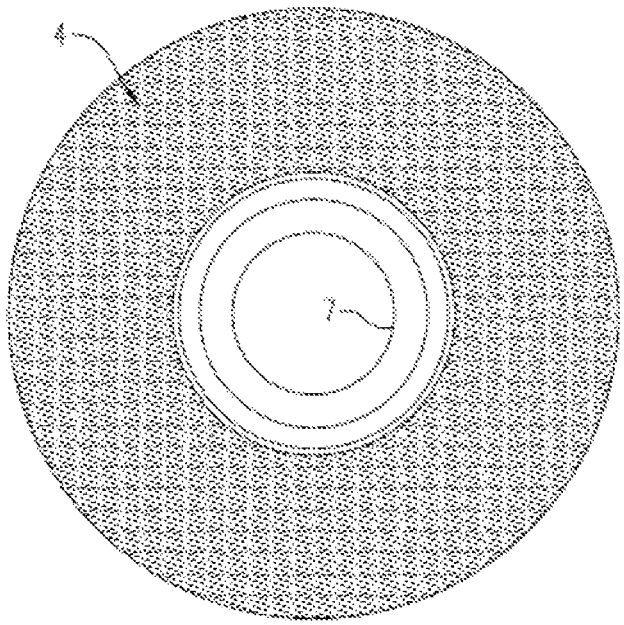

For illustration, the invention is described on the individual examples of its design.

Example 1

The chamber 1 with shape memory for pressure correction in the tire, which is a part of the tire or adjacent to the tire wall and is connected with the internal space of the tire at one end and with the exterior environment at the other end, has the shape of a curved hollow channel, with its enclosing wall partly formed by the pair of surfaces 10 lengthwise coplanar with the chamber 1 (channel) under the angle of α=2 to 15°. The angle α>0° is on the contacting edge of these surfaces 10 located on the further side from the center of the chamber 3 cross-section. The chamber 1 is placed in the area of the tire side wall 4 at its bead.

When manufacturing the chamber 1 a flat matrix 9 with a shaped protrusion and with a width of 0.8 mm and thickness of 0.02 mm, is inserted between the layers forming the tire side wall 4 before vulcanization, then the vulcanization is performed and the inserted matrix 9 is extracted as a whole towards the center axis 2 of the tire 4. The thickness of the matrix 9 refers to the measurement roughly perpendicular to the width of the matrix 9. The width of the matrix 9 impressed in the ancillary structure 6 as shown on the FIG. 3G is then the entire length of the matrix 9 along the arrow and the thickness is measured roughly across the matrix 9 arrow. The member 19 with the cross-section identical to the chamber 1 cross-section is inserted into the formed slot with the generally U-shaped cross-section, opening towards the center axis of the tire 4. The member 19 is fitted with the channel 913 at one end, which opens at the face 12 of the end of the chamber 1 and leads to the internal space of the tire 4; another member 19 opens at the opposite face 12 of the opposite end of the chamber 1 and leads to the external environment outside the tire 4. The matrix 3 can also be extracted in a different direction than towards the axis of tire 4, e.g. offward the axis of the tire 4 or in parallel with the axis of the tire 4. The condition is that the formed slot or extended surfaces 10", respectively, through which the matrix 9 is being extracted were created in the direction, in which, after fitting the tire 4 on the rim 7, sufficient forces are present to seal them hermetically, as shown on FIG. 3H, where this is shown at the ancillary structure 6.

Figure 3A:
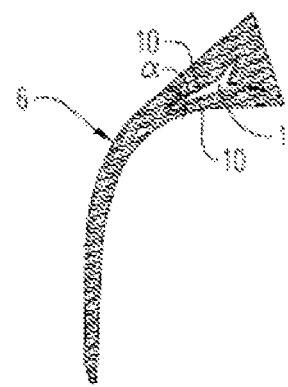
FIGS. 3A through 3I show different types of chamber cross-sections in the sectional view and their process of manufacture.
Figure 3B:
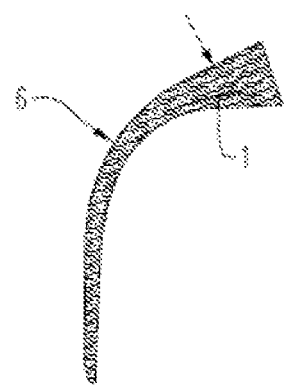
Figure 3C:
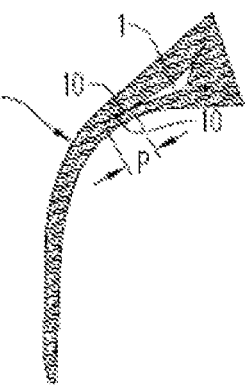
Figure 3D:
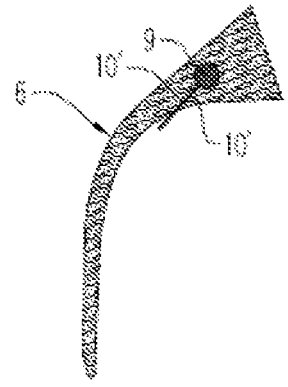
Figure 3E:
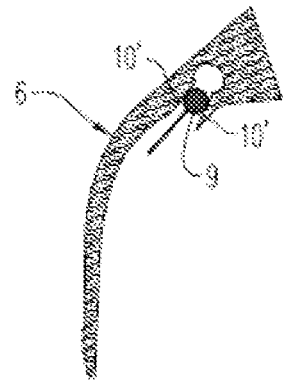
Figure 3F:
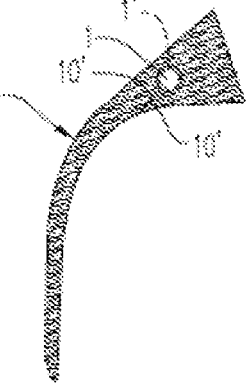
Figure 3G:
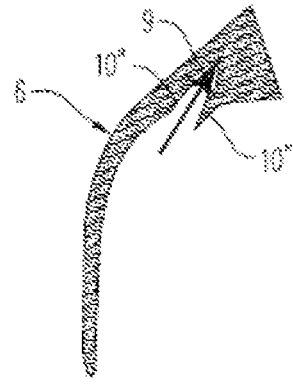
Figure 3H:
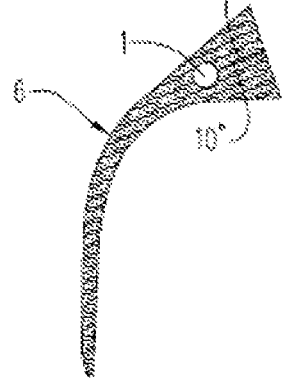

The FIG. 3H shows the circular chamber 1 created in the ancillary structure 6, while the extended surfaces 10" are led out through the wall of the ancillary structure 6 towards the free space outside the tire 4 and rim 7. The surfaces 10" are hermetically pressed together by pressure between the tire 4 and rim 7. Accordingly, it is possible to create the chamber 1 with the extended surfaces 10" in the tire 4 side wall. It is also possible to lead out the extended surfaces 10" through the wall of the ancillary structure 6 towards the tire 4 wall.

Generally, it is then possible to lead the surfaces 10" out of the ancillary structure 6, and/or tire 4, towards any outside wall of the ancillary structure 6, or of the tire 4, respectively. The only condition is that they are placed at the extended surfaces 10" to the point sufficient pressure, which will ensure their hermetical sealing.

In general, the chamber 1 can contain a part deformable to zero cross-section area of the chamber 1. A part non-deformable to zero cross-section area of the chamber 1 can be added. The examples describe mainly the deformable part of the chamber 1, nonetheless the part of the chamber which is not deformable to zero chamber cross-section area can be created in a similar way, too. To make it clear, any part of the chamber 1, which may be concerned, is referred to as the chamber 1 in this application. Although the chamber 1 in the examples is placed mainly at the tire 4 bead, it can also be created—while keeping the considerable portion of the design advantages —anywhere else in the wall or at the wall of the tire 4, so, for example, even at the tread of the tire 4.

Figure 2A:
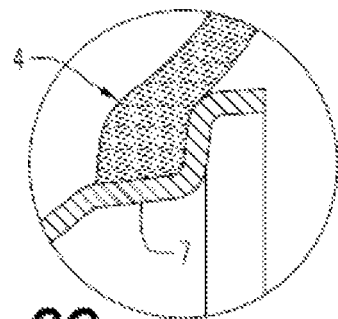
FIGS. 2A through 2D show the detail of the chamber arrangement.

FIG. 1A shows the cut through an unloaded tire 4 and rim 7. The circle indicates the place used for placement of the chamber 1 detail on the other figures, while FIG. 2A depicts an enlarged detail of this circle.

Figure 2B:
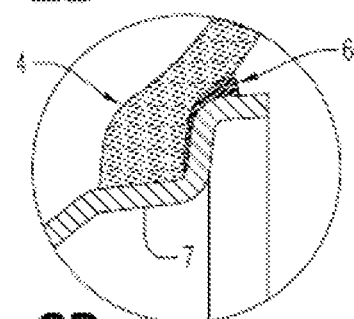

On FIG. 2B, the ancillary structure 6 is placed between the unloaded tire 4 and rim 7. The cross-section of the tire 4 wall matches the shape of this structure 6 from one side and from the other, it matches to the cross-section of the rim 7. It holds at the required location due to the pressure of the tire 4 onto the rim 7, or it can be fixed to the rim 7 or tire 4.

Figure 2C:
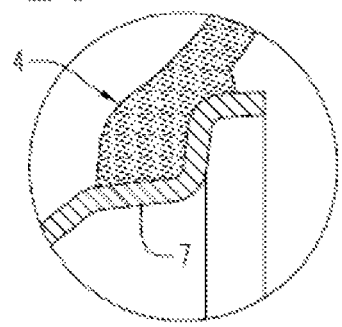
Figure 2D:
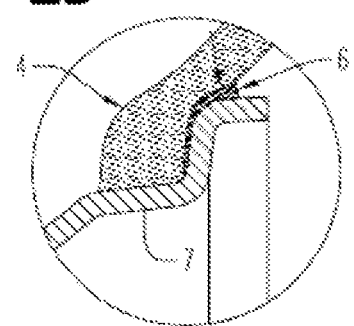

FIG. 2D shows the tire 4 side wall under load. The tire 4 affects the ancillary structure 6 by its wall and compresses it against the rim 7. Within contained chamber 1 will be compressed along with the ancillary structure 6. The direction of deformation is indicated by the broken arrow.

The chamber 1 can be created in the ancillary structure or directly in the tire 4 wall, namely either between the layers of the commonly produced tire 4, or if there is not enough space in the tire 4 wall, it can be created in the lug boss on the tire 4 wall, which is analogous to the ancillary structure 6. Such a lug boss on tire 4 wall is shown on FIG. 2C and as for a cross-section, it corresponds with the ancillary structure 6 on FIG. 2C in this case. Under load, the lug boss will get deformed accordingly with the ancillary structure 6 on FIG. 2D.

The tire 4 is being periodically compressed when driving, while its bead is being pressed onto the rim 7 in the bead area and the wall of the tire 4 is getting closer to the rim 7 periodically above the bead area. This forcing and approaching ensures the transverse closure of the chamber 1 placed at the tire 4 bead or above it. Lengthwise, the chamber 1 can have a shape of incomplete annulus and can veer from the annulus-like shape towards the axis of the tire 4 as well as in parallel with the axis; the only condition for transverse closure is that the chamber 1 was located at the point of sufficient force for closing the chamber 1. Such a point can be found e.g. between the tire 4 and rim 7. A part of the chamber 1, or the whole chamber 1 can be circular, elliptic, linear, spiral, or helical, or in the shape of another curve, or the center of the cross-section area of the chamber 1 or its part can be placed on these curves.

Example 2

FIG. 3A shows the ancillary structure 6 containing the chamber 1 with the cross-section in the shape of a three-pointed star. This part of the chamber 1 is placed on the outside side wall of the tire 4 above the tire 4 bead and the rim 2. The tire 4 is not shown here and the chamber 1 is shown in an unloaded condition. There is a sharp angle $\alpha$ on the surfaces 10 comprising the wall of one of the points. The sharp angle will ensure the hermetical sealing of the walls forming the chamber 1 upon deformation of the chamber 1, while there is minimum bending and tension in the walls, which reduces the overall tension and material stress in the chamber 1 walls. The FIG. 3B shows a cross-section through the chamber 1 under load, the walls of the chamber 1 adjoin each other in the loaded point, the chamber 1 is blind and has the zero cross-section area of the chamber 1 in this point. The direction of deformation caused by load is indicated by a broken arrow.

The chamber 1 with sharp angles on the sides of surfaces further from the center of the chamber 1 cross-section area shown here can be created at any place of the tire 4 wall or in its vicinity, for example also in the tread or side wall of the tire 4. The reason why the concept "the center of cross-section area of the chamber 1 is used is that the cross-section area of the chamber 1 needs not to be a definable geometrical center or point of symmetry. So it is an approximate center of this area.

FIG. 3C shows the ancillary structure 6 containing the chamber 1 in the shape of three-pointed star. The chamber 1 has the same profile as the chamber 1 on FIG. 3A. However, the surfaces 10 of the chamber 1 walls are extended beyond the point of sharp angle shown on FIG. 3A and continue in parallel to each other, it means under zero angle, deeper into the chamber 1 wall. Due to this extension, indicated by P, the walls of the chamber 1 are physically separated from each other, and these extended surfaces 10s reduce the forces, caused by deformation, transferred between the chamber 1 walls. In this example, the extension is shown for all points of the three-pointed-star shaped chamber 1 even though it is indicated by P only at one of its points.

Upon deformation of the tire 4, forces are absorbed by this separation of surfaces that could otherwise damage the walls of the chamber 1 if the surfaces were not separated. Such a chamber 1 with extended surfaces 10 can be created at any place in the wall of the tire 4 or in its vicinity, so for example, in the tread or side wall of the tire 4, too.

The chamber 1 is located at the point with variable deformation forces. When these forces act temporarily against the forces closing the chamber 1 during the cycle, the extension of the surface 10 of the chamber 1 walls will allow a wider opening of the chamber 1 walls temporarily and the touch point of the chamber 1 walls will move towards the extension in this case. If there was no extension of the surfaces 10, the wall of the chamber 1 could be torn in the point of sharp angle shown on FIG. 3A.

Example 3

The chamber 1 can be manufactured by pressing in the matrix 9 between the walls of the chamber 1 and subsequent extraction of the matrix 9. The extension of the surfaces 10 outside the chamber 1 itself under the zero angle between the surfaces 10 then allows simple extraction of the matrix S) in the manufacture of the chamber 1.

FIG. 3D shows the manufacture of the chamber 1 with a circular profile. The partly circular matrix 9 is impressed in the material of future chamber 1 walls; it is then extended outside the circular cross-section of the chamber 1 and led out of the ancillary structure 6. After pressing out, this extension will make parallel surfaces 10 passing through the chamber wall up to the point outside of the ancillary structure 6. Thus it will create a passage for extraction of the impressed matrix 9. Extraction of the matrix 9 is shown on FIG. 3E.

After fitting the ancillary structure 6 and tire 4 onto the rim 7, these extended surfaces 10 will press together tight and the chamber 1 cross-section will take on the required cross-section shape of the unloaded chamber 1. This sealing and taking the desired cross-section of the chamber 1 is shown on FIG. 3F. Accordingly, the chamber 1 can be created in the wall of the tire 4, too.

If the matrix 9 is at least partly made of bendable or flexible material, e.g. vulcanized-rubber-coated fabric or thin steel sheet, it will contract or bend upon extraction and will not present any significant resistance. The extraction of the matrix 9 can be made easier by using a separator, which is applied on the matrix 9 walls before vulcanization. This separator ensures that the matrix 9 will not adhere to the chamber 1 walls upon vulcanization.

FIG. 3G shows partial extraction of the arrow-shaped matrix 9. Not even the walls of the ancillary structure 6 present any significant resistance due to their flexibility.

Extraction of the matrix 9 can be made easier by temporary opening of the profile, created by the matrix 9 in the ancillary structure 6, using a suitable tool. The matrix 9 can also be divided into more parts and extract them piece by piece. This will make the extraction easier mainly in case of using a solid matrix 9.

Figure 4A:
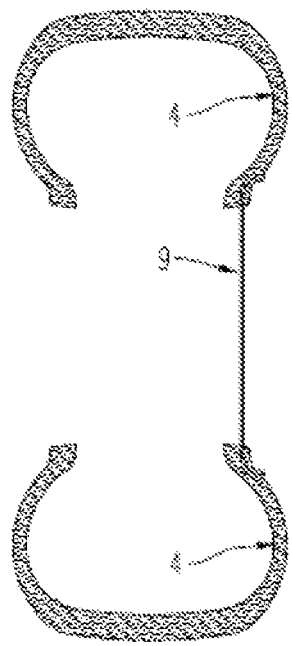
FIGS. 4A through 4D show the procedure of the matrix extraction, where
Figure 4C:
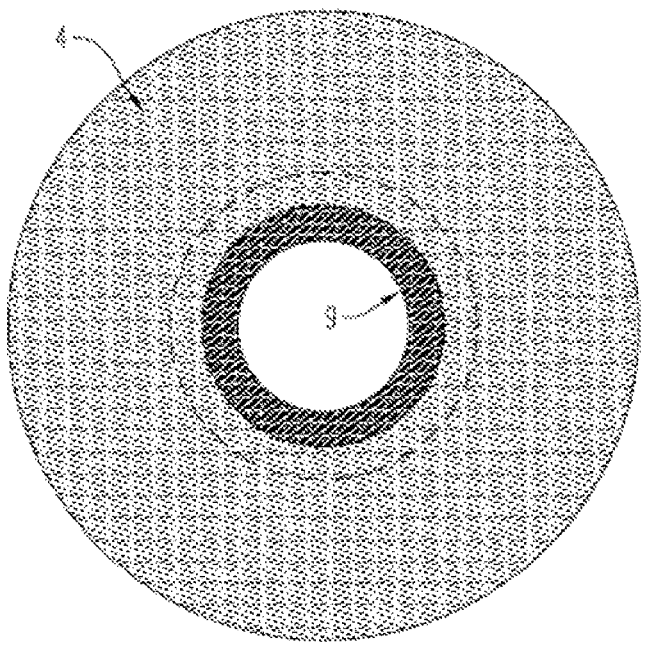
Figure 4B:
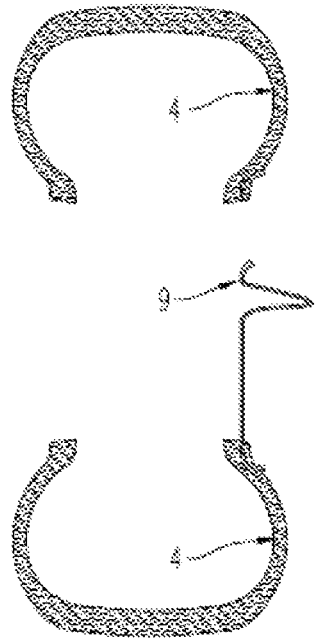
Figure 4D:
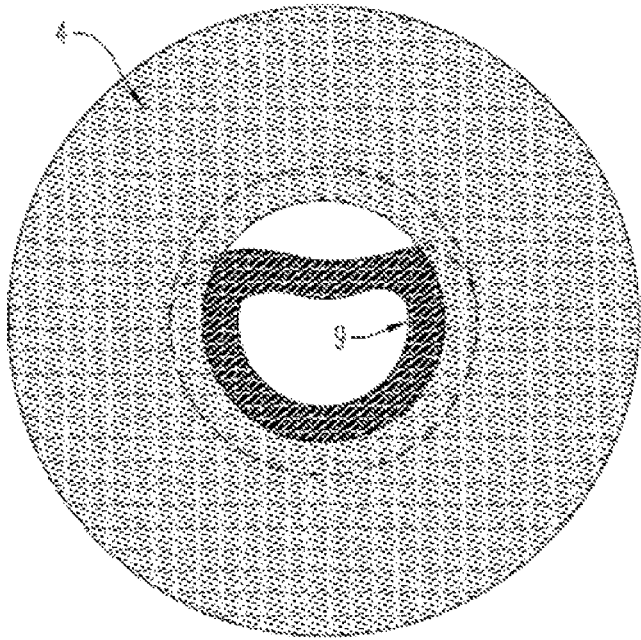

FIG. 4A shows the tire 4 with an impressed bendable matrix 9 in section; FIG. 4C shows this in a side view. In the side view, the wall of the tire 4 overlying the matrix 9 is shown as partly transparent. FIGS. 4B and 4D show partial extraction of the matrix 9 in its upper part, while the side and bottom parts of the matrix 9 are not extracted yet.

Upon extraction, the matrix 9 has crouched and bent and thus created a space for extraction of the remaining matrix 9.

Figure 3I:
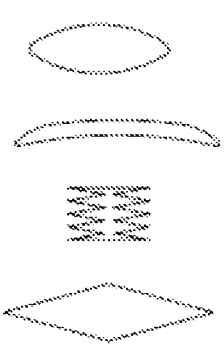

FIG. 3I shows other efficient designs of the chamber 1 profile in the shape of two types of lenses. Then it shows a folded and diamond-shaped type of the chamber 3 profile. The efficient design of the chamber 1 shape is chamber 1 with the walls as perpendicular as possible to the forces acting on the walls of the chamber 1. This prevents mutual shifting of the opposing walls of the chamber 1 over each other and their abrasion and destruction.

The walls of the tire 4 or the ancillary structure 6 can be provided with rubber industry reinforcing and strengthening elements such as fabric cord, wire, impact ply, reinforce strip, or bandage.

Rubber making the body of the tire 4 can have relatively high permeability for air entrapped in the tire 4. For this reason, a layer of so called internal rubber, that ensures impermeability of the tire 4, is used for its innermost layer. Accordingly, internal rubber can be used for walls of the chamber 1. In the manufacture of the chamber 1, internal rubber can be used directly for the production of the tire 4 layers or for the ancillary structure 6, between which the matrix 3 is being placed when the chamber 1 is produced, or a layer of internal rubber can be put on the matrix 9 before its insertion between the layers of the produced tire 4 or ancillary structure 6. Upon the subsequent vulcanization, the internal rubber merges with the adjacent layer of material.

The chamber 1 can also be made by cutting operation, cutting with a thermal knife, melting off, or burning out within the wall of the tire 4 or ancillary structure 6. It is also possible to create the chamber 1 by spewing, in a similar way as rubber hoses or seals are produced.

Either a hollow hose to contain the chamber 1 can be put into the slot formed by the matrix 9 or by the above mentioned method, or a solid hose that will make the final space of the chamber 1 by its outer walls and walls formed by the matrix 9 or in other above-mentioned way. The hollow hose can be made of more elastic material than the walls of the slot and it will then better close and seal the chamber 1 under load. It can also be made of impermeable rubber and substitute the need for adding internal rubber into walls of the chamber 1 upon its vulcanization. Accordingly, the solid, i.e. not hollow hose can effectively be made of more elastic material than the walls of the slot and it will better diagonally close and seal the chamber 1 under load, while it will leave transition space in the chamber 1, between its external walls and walls formed by the matrix 9 or in other above-mentioned way, when not under load.

Example 4

The rims 7 are standardized, nonetheless their parts, profiles of which are supposed to correspond to the wall of the ancillary structure 6 or the wall of the tire 4 containing the chamber 1, can vary from type to type of the rim 7. This can be treated by standardizing the relevant part of the rim 7, or by making a support 15 fixed to the rim 7 or to the hubcap or between the rim 7 and tire 4. This support Vs then takes on the supporting function of the rim 7. To function properly, the support 15, by its profile, must partly correspond to the profile of external walls of the ancillary structure 6 containing the chamber 1 or the walls of the tire 4 containing the chamber 1. The support 15 can efficiently be part of the hubcap.

The chamber 1 can be created in the ancillary structure 6 by gluing two strips of material together, e.g. two rubber strips, which already have the chamber 1 profile impressed in them. These strips can form a complete circle lengthwise with the chamber 1, or at least a part of the circle in the same direction. Instead of gluing together, the strips can be just placed over each other, and they are then sealed by constant pressure between the tire 4 and rim 7 These pressures exceed dozens of atmospheres at some points of contact of contemporary rims 7 and tires 4.

The tire 1 wall cross-sections vary for different tires 4. Production-simple solution is to place the chamber 1 into the ancillary structure 6 and to provide the ancillary structure S with a standardized profiled wall. The tires 4 must then be provided with a similar profile of their walls in the point of contact with the ancillary structure 6, which is a simple change in the tire 4 design. This can make sure that forces between the wall of the tire 4 and the ancillary structure 6 are more-less perpendicular to the wall of the ancillary structure 6, and thus reduce the risk of mutual shifting and abrasion.

Example 5

Figure 5A:
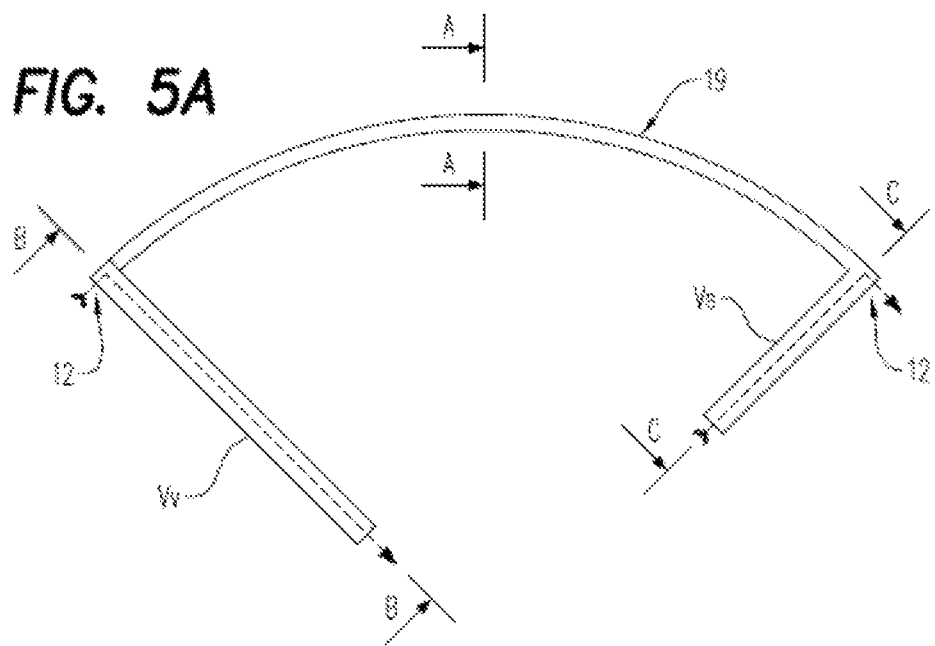
FIG. 5A shows the member.

FIG. 5A shows the member 19. The top arc part of the member 19 cross-section corresponds to the cross-section of the chamber 1. Straight parts indicated as Vv and Vs include through channels 913 interconnecting the faces 12 with the opposite ends of Vv and Vs parts. The channels 913 are indicated by broken arrows.

Figure 5B:
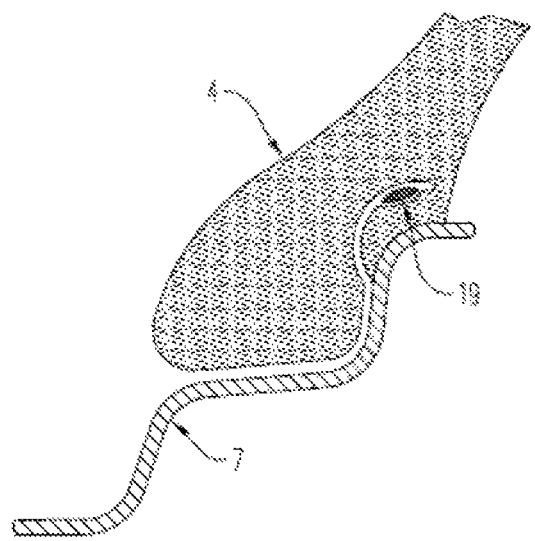
FIGS. 5B through 5F show the cut of the tire with inserted member.

FIG. 5B shows fitting of the tire 4 onto the rim 7. Prior to this, an impression of the matrix 9 was made in the tire 4, along the entire circumference of the tire 4. Since the chamber 1 created in this way must be discontinued in order to function, the discontinuation will be made by inserting the member 19, which at least in one of its points corresponds to the chamber 1 cross-section. This member 19, which will prevent air permeation between the parts of the chamber 1 through the part of the chamber 1 with the member 19 inserted.

A part of the member 19 is inserted into the chamber 1, with its shape corresponding to the chamber 1 profile. The profile of this part of the member 19 corresponds to the A-A cross-section on FIG. 5A. After complete fitting of the tire 4 onto the rim 7 shown on FIG. 5C, the walls of the chamber 1 and the walls of the member 19 will get sealed and make the chamber 1 impermeable in this part.

Figures 5C, 5D:
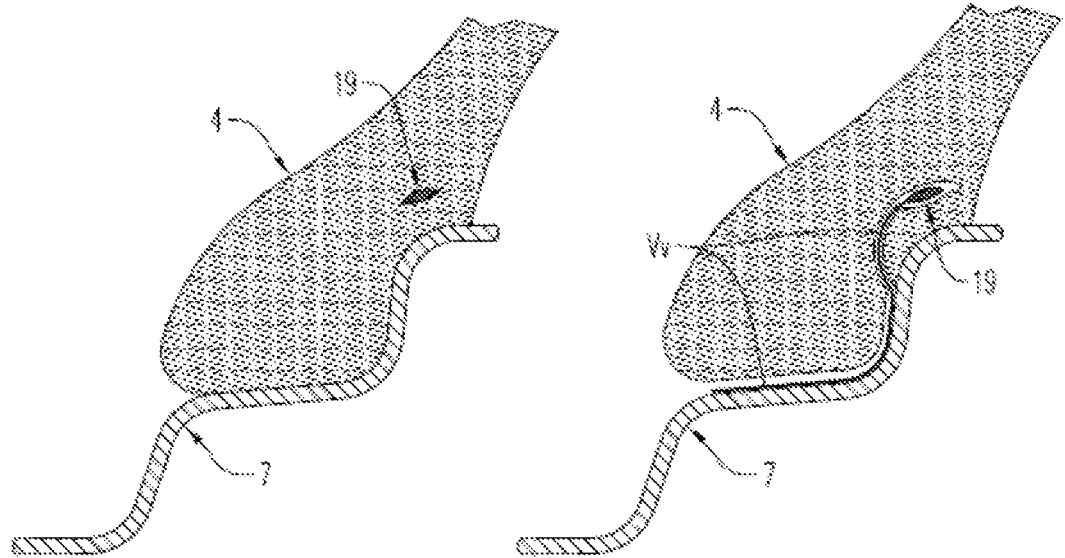

FIG. 5D shows the insertion of the member 19, including its Vv part, between the walls of the chamber 1 and also between the tire 4 and rim 7. After complete fitting of the tire 4 onto the rim 7 shown on FIG. 5E, the member 19, including its Vv part, the chamber 1, tire 4, and rim 7 will seal together. The chamber 1 is interconnected between the face L2 of the member 19 and the internal space of the tire 4 by the channel 913 placed in a part of the member 19 marked as Vv. The section of the part of the member 19 indicated as B-B on FIG. 5A corresponds to the section of the member 19 shown on FIGS. 5D and 5E, while, however, on FIGS. 5D and 5E the member is bent in its Vv part in order to copy its lead-out of the chamber 1.

Figures 5E, 5F:
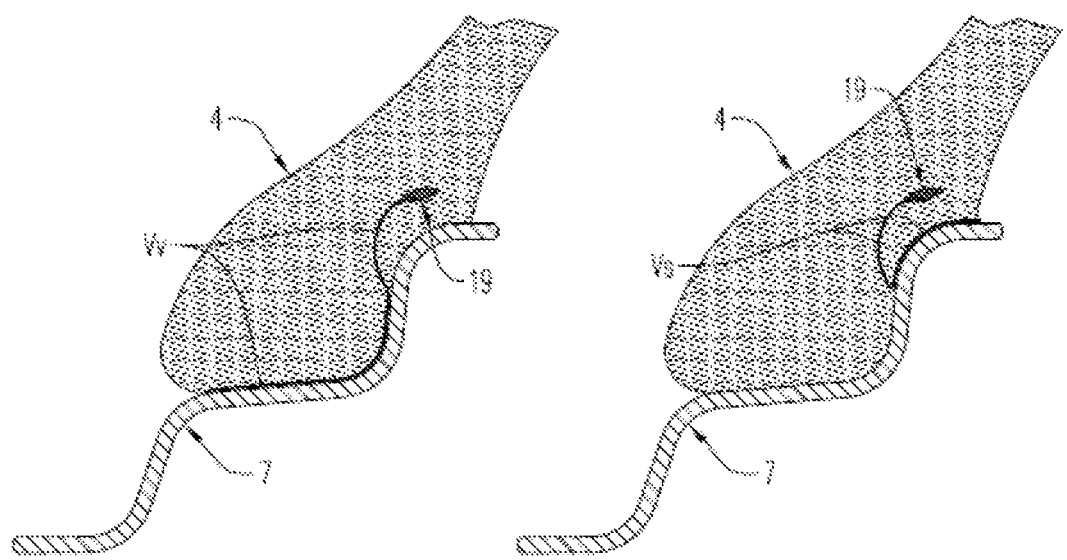

Accordingly, the chamber 1 is interconnected between the opposite face 12 of the member 19 and the external environment by another channel 913 placed in a part of the member 19 marked as Vs, as is shown on FIG. 5F. The section of a part of the member 19 indicated as C-C on FIG. 5A corresponds to the section of the member 19 shown on FIG. 5F, while FIG. 5F shows the member 19 bent in its Vs part in order to copy its lead-out of the chamber 1.

Channels 913 can also be embedded in the wall of the tire 4 or rim 7, or formed inside the wall of the tire 4 or rim 7, and they need not be an integral part of the member 19.

Example 6

If the deformable part of the chamber 1 is made almost along the entire circumference of the tire 4, then at the same time, the chamber 1 will be diagonally closed by deformation in points of its inlet and outlet during the revolution of each tire 4, and there will be no total pressure equalizing with the internal space of the tire 4 or external environment in the face of the chamber 1, which can then lead to inability to set the built-in output pressure through compression ratio of the deformable and non-deformable part of the chamber 1. If the output pressure of the chamber 1 is controlled by the valve operated depending on pressure in the tire 4, the output pressure need not be adjusted through the ratio of parts of the chamber 1, and the non-deformable part of the chamber 1 is not essential, but still can be present. In this case, the inability to set the output pressure of the chamber 1 through the built-in output pressure does not necessarily mean a hindrance.

When the output pressure of the chamber 1 is set by the built-in output pressure of the chamber 1 and also when the chamber 1 is provided with a valve enabling deflating the tire 4 through the chamber 1 it is suitable to put the inlet and outlet of at least a part of the chamber 1, deformable to zero cross-section area of the chamber 1, to a relative distance that will allow that at least once during one revolution of the loaded tire 4, the whole chamber will be at the place unloaded by the tire 4 deformation causing the deformation of the chamber 1 to its zero cross-section area. It means that all parts of the deformable part of the chamber 1 will be interconnected with each other at least once per loaded wheel revolution.

Figure 9:
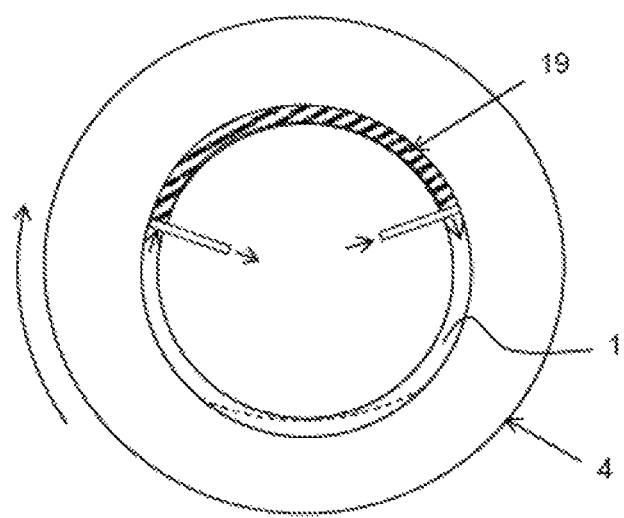
FIG. 9 shows a tire with a chamber having a non-deformable portion and a deformable portion that is shorter than a circumference of the tire at the location of the deformable portion minus a deformed portion of the tire.

The distance between the inlet and outlet is 0ven, for example, by the length of the member 19. The chamber 1 can also be made in the required length of the tire 4 circumference by using the matrix 9 that will be shorter than the circumference of the tire 4 by the length of the tire 4 circumference deformed by loading the tire 4, can be in a length that extends around less than 360° of the tire 4, such as by closing off a deformable portion of the chamber (deformed chamber shown in phantom in FIG. 9) with an elongated member 19 that is not deformable so another portion of the chamber that extends around less than 360° of the tire in which the elongated member is disposed is non-deformable, i.e., the deformable portion of the chamber 1 is shorter than a circumference of the tire at the location of the deformable portion minus the deformed portion of the tire as seen in FIG. 9, or possibly by a greater distance.

The difference between the length of the matrix S and the length of the entire tire 4 circumference can be then filled with liquid material of the tire 4 walls upon vulcanization of the tire 4.

In manufacture of the chamber 1, it is also possible to use the matrix 9 in the required length of the chamber 1 with the additional part of the matrix 9 added, which will remain in the wall of the tire 4 after its vulcanization of the tire 4 and chamber 1 and will eliminate the need of insertion of the member 19, or the need of moving the material within the tire 4 wall upon vulcanization.

Example 7

Figure 6A:
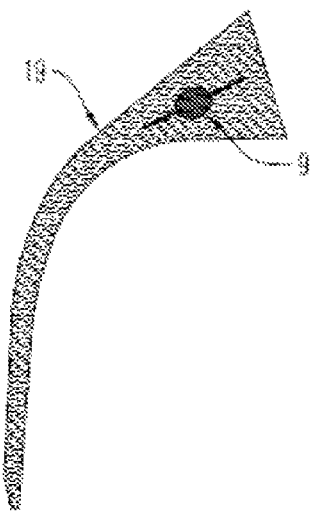
FIGS. 6A through 6E show different shapes of the cross-section of the chamber and matrix in their manufacture and the function of the chamber.
Figure 6B:
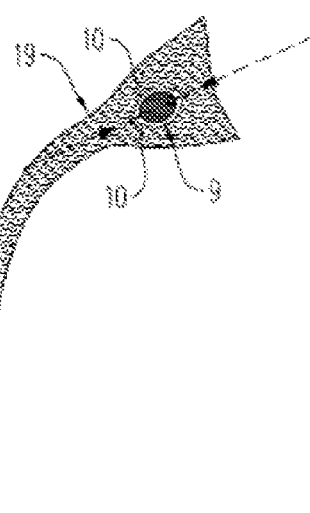
Figure 6C:
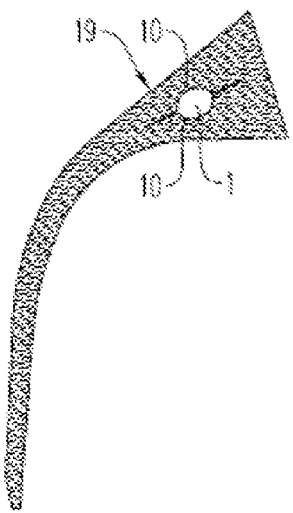
Figure 6D:
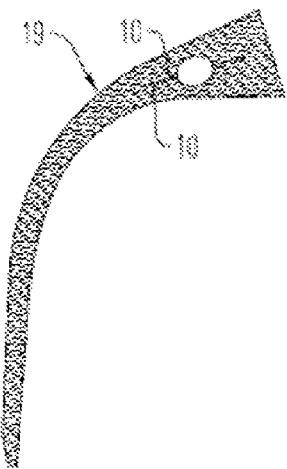
Figure 6E:
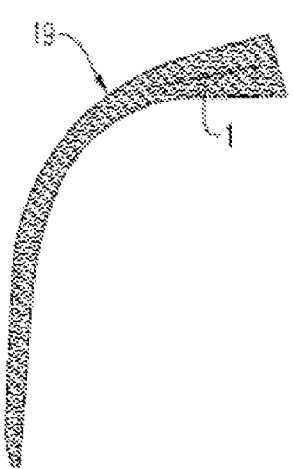

FIG. 6A shows a cross-section through the chamber 1 with an impressed matrix 9. After vulcanization, the matrix 9 creates the chamber 1 with the extended surfaces of the chamber 1 walls. The broken arrows on FIG. 6B represent application of pressure on the wall of the chamber 1 roughly in parallel with the extended surfaces of the chamber 1 wall and the withdrawing the chamber 1 walls from the matrix 9. A part of the matrix 3 contracts. There is only a minimum contact between the walls of the matrix S and chamber 1 and the matrix 9 can be extracted from the chamber 1 lengthwise. FIG. 6 shows the chamber 1 after extraction of the matrix 9 and before fitting between the tire 4 and rim 7. FIG. 6D shows the chamber 1 after being fitted between the unloaded tire 4 and rim 7. The surfaces 10 of the chamber 1 walls will fit tight on each other and make a zero angle between each other. FIG. 6E shows the chamber 1 at the point loaded by deformation of the tire 4. All the walls of the chamber 1 fit together and make a zero cross-section area of the chamber 1 at this point.

Example 8

The tire 4, ancillary structure 6, rim 7, and support 15 or hubcap all can include formed parts and components of the chamber 1. For example, a part of the chamber 1 deformable to a zero cross-section area of the chamber 1 formed in the ancillary structure 6, suction inlet with a filter in the rim 7; the discharge channel can be led through the wall of the chamber 4. All these components can intercommunicate through the openings, which will be created against each other on the individual intercommunicating components, while the edges of these openings will be pressed together and sealed by the pressure between the tire 4 and rim 7. Since the parts such as tire 4, rim 7, ancillary structure 6, hubcap or support 15 are always at least partly concentric, the openings can be made in the same distance from the axis and when assembling the wheel it must only be ensured that they are placed opposite even along the circumference. The correct assembly along the circumference can be made easier by making recesses along the longer part of circumference or along the entire circumference of at least one communicating component. Thus the communication opening of the opposite interconnected component will always be against the recess after the assembly of the wheel. Even when the recess is made not along the whole component circumference but only along the part of it, the communication opening of the opposing component will then fit more easily than if both communication channels had small dimensions.

Figure 7A:
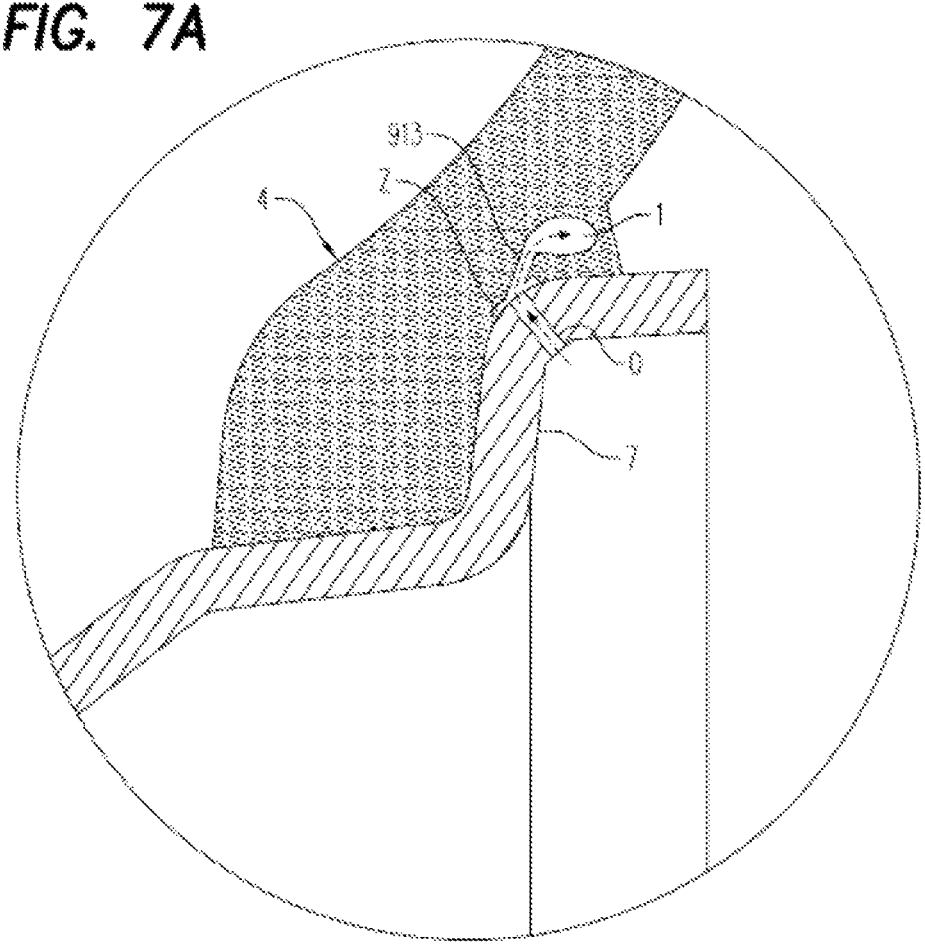
FIG. 7A shows the detail of the chamber and interconnection of its parts outside the tire.

FIG. 7A shows the section through the tire 4 indicated by light gray color, including the chamber 1 interconnected by a channel with the diameter of 0.5 mm leading into the recess Z on the outer wall of the tire 4 between the outer wall of the tire 4 and rim 7. The recess Z has thickness of 1 mm, width of 2 mm and it closes the circle, i.e. its length corresponds with the entire length of the circumference of the tire 4 and/or rim 7 at this area. An opening 0 with the diameter of 0.5 mm indicated by dark gray color is made in the rim 7 against the recess Z, which connects the recess Z with the external environment. The opening O will always be located against the recess Z, even in the event of swing of the tire 4 against the rim 7. At the same time, they will always be sealed together by pressure of the tire 4, or the ancillary structure 6, onto the rim 7. The dotted-broken arrow indicates the air flow from the external environment through the opening 0 in the rim 7 into the recess Z; the broken arrow indicates the air flow from the recess Z through the channel into the chamber 1. The recess Z and opening 0 will therefore become a part of the channel.

Example 9

Figure 8A:
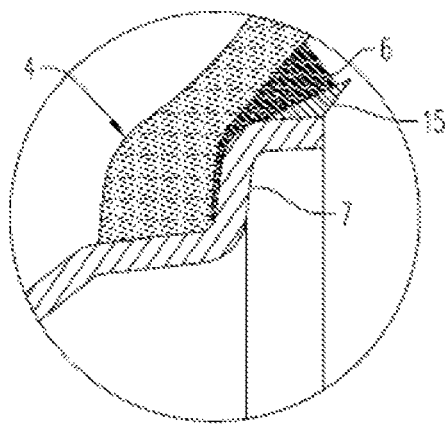
FIG. 8A shows the detail of the arrangement of the member and support between the tire and rim.

FIG. 8A shows the tire 4, ancillary structure 6, rim 7, and support 15. The ancillary structure 6 partly leans against the wall of the tire 4, partly against the rim 7, and partly against the support 15. In this case, the support 15 completes the rim 7 and unlike the rim 7 at this point, it corresponds to the profile of the wall of the ancillary structure 6. Moreover, the support 1S in this example allows the extension of the ancillary structure 6 to places, where it would not be otherwise possible to use the approaching of the tire 4 to the rim 7. Efficiently, the support 15 is solid, e.g. made of steel or plastic. It can be also made of little compressible material, e.g. vulcanized rubber.

UTILITY OF THE PATENT

The chamber with shape memory for pressure correction in the tire according to this invention will find its application in production of new tires and in modification to existing tires, both for passenger vehicles and utility vehicles.

The invention claimed is:

1. A wheel rim for a tire, the rim having at least one wall, the tire having an interior wall defining a reservoir and an ancillary structure at least partially defining a chamber, the ancillary structure having shape memory for pressure correction in the tire, the chamber comprising a connection component connected with the reservoir at a first end of the chamber and with a fluid source at a second end of the chamber, wherein the chamber is curved over at least a part of a length thereof and comprises a pair of surfaces that form an angle $\alpha=0$ to $120°$ with each other, wherein the at least one wall of the rim is fitted with a profile in which at least part of the ancillary structure is disposed.

2. An arrangement for a tire, the arrangement comprising the tire and having an interior wall defining a reservoir, comprising:
  a component adapted to at least partially define a chamber, the component having shape memory for, pressure correction in the tire, the component being a part of the tire or an ancillary structure adapted to be adjacent to a tire wall,
  an elongated member disposed in the chamber, and
  a connection arrangement adapted to be connected with the reservoir at a first end of the chamber and with a fluid source at a second end of the chamber, the component being curved over at least part of a length thereof and having a wall at least partially defining the chamber and comprises a pair of non-circular surfaces having at least portions that are substantially parallel.

3. An arrangement for a an inflatable article, the arrangement including the inflatable article and an interior wall defining a reservoir, comprising:
  a component adapted to at least partially define an elongated chamber, the component being a part of the inflatable article or a part of an ancillary structure disposed in contact with an exterior inflatable article wall, and an elongated member disposed in the chamber.

4. The arrangement for the inflatable article as set forth in claim 3, wherein the elongated member defines a tubular space with the component.

5. The arrangement for the inflatable article as set forth in claim 3, wherein the elongated member is made from a material having a greater elasticity than a portion of the component defining the chamber.

6. The arrangement for the inflatable article as set forth in claim 3, wherein the elongated member extends over less than an entire inflatable article length of the chamber.

7. The arrangement for the inflatable article as set forth in claim 3, wherein the inflatable article is a tire.

8. The arrangement for the inflatable article according to claim 3, wherein the ancillary structure is connected to a rim, a support, or a side wall of the inflatable article.

9. An arrangement for a an inflatable article, the arrangement including the inflatable article and an interior wall defining a reservoir, comprising:
  a component adapted td at least partially define an elongated chamber, the component being a part of the inflatable article or a part of an ancillary structure adapted to be adjacent to an inflatable article all, and
  an elongated member disposed in the chamber,
  wherein the ancillary structure adjacent to a side wall of the inflatable article on one side of the ancillary structure and is adjacent a rim on another side of the ancillary structure.

10. The arrangement the inflatable article according to claim 3, wherein the elongated member is connected to the component.

11. A arrangement for a an inflatable article, the arrangement including the inflatable article and a or wall defining a reservoir, comprising:
  a component adapted to at least partially define an elongated chamber, the component being a part of the inflatable article or a part of an ancillary structure adapted to be adjacent to an inflatable article wall, and
  an elongated member disposed in the chamber,
  wherein the elongated member is non-tubular.

12. The arrangement for the inflatable article according to claim 3, wherein a cross-sectional area of the elongated member, measured perpendicular to a length of the elongated member, is less than or equal to a cross-sectional area of the chamber, measured perpendicular to a length of the chamber.

13. An arrangement for a an inflatable article, the arrangement including the inflatable article and an interior wall defining a reservoir, comprising:
a component adapted to at least partially define an elongated chamber, the component being a part of the inflatable article or a part of an ancillary structure adapted to be adjacent to an inflatable article wall, and an elongated member disposed in the chamber,
wherein a space is defined between an exterior surface of the elongated member and a surface of the chamber.

14. The arrangement for the inflatable article according to claim 3, wherein the elongated member is non-circular in axial cross-section.

15. The arrangement for the inflatable article according to claim 3, wherein the elongated member defines part of a wall of the chamber.

16. An arrangement for a an inflatable article, the arrangement including the inflatable article and an interior wall defining a reservoir, comprising:
a component adapted to at least partially define an elongated chamber, the component being a part of the inflatable article or a part of an ancillary structure adapted to be adjacent to an inflatable article wall, and an elongated member disposed in the chamber,
wherein the component has a wall at least partially defining the chamber and comprises a pair of surfaces having at least portions that are substantially parallel.

17. The arrangement for the inflatable article according in to claim 16, wherein the portions of the pair of surfaces are parallel.

18. The arrangement for the inflatable article according to claim 17, wherein other portions of the pair of surfaces contact each other.

19. The arrangement for the inflatable article according to claim 16, wherein other portions of the pair of surfaces extend to an outside of the component.

20. The arrangement for the inflatable article according to claim 16, wherein other portions of the pair of surfaces define an angle between 0-180°.

21. The arrangement for the inflatable article according to claim 16, wherein the pair of surfaces comprises a concave surface.

22. The arrangement for the inflatable article accordion to claim 16, wherein other portions of the pair of surfaces approach each other.

23. The arrangement for the inflatable article according to claim 22, wherein the other portions of the pair of surfaces meet at a terminal point.

24. The arrangement lit the inflatable article according to claim 16, wherein other portions of the pair of surfaces define a V-shape.

25. The arrangement for the inflatable article according to claim 16, wherein other portions of the pair of surfaces define a U-shape.

26. The arrangement for the inflatable article according to claim 16, wherein the pair of surfaces extend outside of the chamber.

27. The arrangement for the inflatable article according to claim 26, wherein substantially parallel portions of the pair of surfaces are disposed outside of the chamber.

28. The arrangement for the inflatable article according to claim 27, wherein the substantially parallel portions of the pair of surfaces contact each other.

29. The arrangement for the inflatable article according to claim 28, wherein the substantially parallel portions of the pair of surfaces are bonded to each other.

30. The arrangement for the inflatable article according to claim 3, wherein the elongated member is disposed inside a deformable portion of the component that is adapted to be deformed in a direction of chamber deformation in a peristaltic fashion when the inflatable article is use.

31. The arrangement for the inflatable article according to claim 30, wherein the component includes a. portion that is more rigid than the deformable portion and is not deformed in the peristaltic fashion when the inflatable article is in use.

32. The arrangement for the inflatable article according to claim 30, wherein the inflatable article is a tire, and the inflatable article is adapted to support a load such that a portion of the inflatable article is deformed when loaded, and the deformable portion is shorter than a circumference of the inflatable article at the location of the deformable portion minus the deformed portion of the inflatable article.

33. An arrangement for a an inflatable article, the arrangement including the inflatable article and an interior wall defining a reservoir, comprising:
a component adapted to at least partially define an elongated chamber, the component being a part of the inflatable article or a part of an ancillary structure adapted to be adjacent to an inflatable article wall, and an elongated member disposed in the chamber,
wherein the elongated member is disposed inside a deformable portion of the component that is adapted to be deformed in a direction of chamber deformation in a peristaltic fashion when the inflatable article is use, and wherein the component has a wall at least partially defining the chamber and comprising or extending to a pair of suffixes having at least portions that are substantially parallel.

34. The arrangement for the inflatable article according to claim 33, wherein the pair of surfaces is parallel to the direction of chamber deformation.

35. The arrangement for the inflatable article according to claim 3, wherein an end of the chamber is connected to at least one of an inflatable article inner space, a reservoir, an outside environment, and a filter.

36. The arrangement for the inflatable article according to claim 3, wherein the chamber has a wall comprising a pair of surfaces that form an angle $\alpha=0$ to $120°$ with each other.

37. A process for providing a chamber for pressure correction in an arrangement comprising a tire and interior surface defining a reservoir, the chamber being at least partially defined by a structure having shape memory, the structure being a part of the tire or an ancillary structure and adjacent to a tire wall, and the chamber being connected with the reservoir at a first end of the chamber and with fluid source at a second end of the chamber, wherein the chamber is curved over at least part of a length thereof, comprising
placing a matrix with a width of 0.1 mm to 200 mm and thickness of 0.01 to 100mm between layers forming a side wall of the tire or the ancillary structure,
extracting at least part of the matrix to form a slot in the tire or the ancillary structure, the slot at least partially defining the chamber, and
inserting an elongated member into the chamber through the slot.

38. The process according to claim 37, comprising, after placing the matrix between the layers forming the side wall of the tire or the ancillary structure and before extracting at least part of the matrix, vulcanizing the side wall of the tire or the ancillary structure.

39. The process according to claim 37, wherein the matrix is extracted longitudinally from between the layers forming the side wall of the tire or the ancillary structure.

40. The process according to claim 37, wherein the matrix is extracted non-longitudinally from between the layers forming the side wall of the tire or the ancillary structure.

41. The wheel rim for a tire according to claim 1, wherein the tire is adapted to support a load such that a portion of the tire is deformed when loaded, the component comprises a deformable portion that is adapted to be deformed in a direction of chamber deformation in a peristaltic fashion when the tire is use, and the deformable portion is shorter than a circumference of the tire at the location of the deformable portion minus the deformed portion of the tire.

42. The wheel rim for a tire according to claim 1, wherein the component has a wall at least partially defining the chamber and comprising or extending to a pair of surfaces having at least portions that are substantially parallel.

43. The arrangement for an inflatable article as set forth in claim 3, wherein the elongated member is removably disposed in the chamber.

44. The arrangement for a tire according to claim 2, wherein the chamber is at least partially ring-shaped, or at least partially helical-shaped.

45. The arrangement for a tire according to claim 2, wherein at least part of the chamber is adapted to be disposed in one or more of a bead of a side wall of the tire, tread of a tire, an inner tube structure, or the ancillary structure.

46. The arrangement for a tire according to claim 2, wherein the chamber is terminated by a connection member at least at one end.

47. The arrangement for a tire according to claim 2, wherein the component is interconnected with at least one of a tire, a rim, and a support.

48. The arrangement for a tire according to claim 2, wherein the portions of the pair of surfaces are parallel.

49. The arrangement for a tire according to claim 48, wherein other portions of the pair of surfaces contact each other.

50. The arrangement for a tire according to claim 2, wherein other portions of the pair of surfaces extend to an outside of the component.

51. The arrangement for a tire according to claim 2, wherein other portions of the pair of surfaces define an angle between 0-180°.

52. The arrangement for a tire according to claim 2, wherein the pair of surfaces comprises a concave surface.

53. The arrangement for a tire according to claim 2, wherein other portions of the pair of surfaces approach each other.

54. The arrangement for a tire according to claim 53, wherein other portions of the pair of surfaces meet at a terminal point.

55. The arrangement for a tire according to claim 2, wherein other portions of the pair of surfaces define a V-shape.

56. The arrangement for a tire according to claim 2, wherein other portions of the pair of surfaces define a U-shape.

57. The arrangement for a tire according to claim 2, wherein the pair of surfaces extend outside of the chamber.

58. The arrangement for a tire according to claim 57, wherein the substantially parallel portions of die pair of surfaces are disposed outside of the chamber.

59. The arrangement for a tire according claim 57, wherein the substantially parallel portions of the pair of surfaces contact each other.

60. The arrangement for a tire according to claim 59, wherein the substantially parallel portions of the pair of surfaces are bonded to each other.

61. The arrangement for a tire according to claim 2, wherein a deformable portion of the component is adapted to be deformed in a direction of chamber deformation in a peristaltic fashion when the tire is use.

62. The arrangement for a tire according to claim 61, wherein the component includes a portion that is more rigid than the deformable portion and is not deformed in the peristaltic fashion when the tire is in use.

63. The arrangement for a tire according to claim 2, wherein the tire is adapted to support a load such that a portion of the tire is deformed when loaded, the component comprises a deformable portion that is adapted to be deformed in a direction of chamber deformation in a peristaltic fashion when the tire is use, and the deformable portion is shorter than a circumference of the tire at the location of the deformable portion minus the deformed portion of the tire.

64. The arrangement for a tire according to claim 61, wherein the pair of surfaces is parallel to the direction of chamber deformation.

65. The arrangement for a tire according to claim 2, wherein an end of the chamber is connected to at least one of a tire inner space, a reservoir, an outside environment, and a filter.

66. An arrangement for a an inflatable article, the arrangement including the inflatable article and an interior wall defining a reservoir, comprising:
   a component adapted to at least partially define an elongated chamber, the component being a part of the inflatable article or a part of an ancillary structure adapted to be adjacent to an inflatable article wall, and
   an elongated member disposed in the chamber,
   wherein the component is an ancillary structure adapted to be disposed between a side wall of the inflatable article and at least one of a rim, and a support connected to the rim.

67. The arrangement for the inflatable article as set forth in claim 7, wherein the component is an ancillary structure adapted to be disposed between a side wall of the inflatable article and at least one of a rim, and a support connected to the rim.

68. An arrangement for an inflatable article, the arrangement including the inflatable article and an interior wall defining a reservoir, comprising:
   a component adapted to at least partially define an elongated chamber having two corners that form acute angles, the component being a part of the inflatable article or an ancillary structure adapted to be adjacent to an inflatable article wall, and
   an elongated member disposed in the chamber, wherein the elongated member defines a tubular space with the component.

69. The arrangement for the inflatable article according to claim 68, wherein surfaces of the component at the corners define angles of 2°-15°.

70. The arrangement for the inflatable article according to claim 68, wherein surfaces of the component at the corners are straight.

71. The arrangement for the inflatable article according to claim 68, wherein portions of surfaces of the component extend beyond the corners.

72. An arrangement for an inflatable article, the arrangement including the inflatable article comprising:
   a wall with an interior and an exterior surface,
   the interior surface defining a reservoir,
   a component defining a tubular elongated chamber, the component being located between the interior surface and the exterior surface, and
   an elongated member disposed in the chamber.

73. An arrangement for a an inflatable article, the arrangement including the inflatable article and an interior wall defining a reservoir, comprising:
   a component adapted to at least partially define a wall of an elongated chamber, the wall of the elongated chamber extending 360 degrees around a longitudinal axis of the elongated chamber, the component being a part of the inflatable article or a part of an ancillary structure disposed in contact with an exterior inflatable article wall, and
   an elongated member disposed in the chamber. .

74. An arrangement for a an inflatable article, the arrangement including the inflatable article and an interior wall defining a reservoir, comprising:
   a one-piece component adapted to entirely define an elongated chamber, the component being a part of the inflatable article or a part of an ancillary structure disposed in contact with an exterior inflatable article wall, and
   an elongated member disposed in the chamber.

75. An arrangement for a an inflatable article, the arrangement including the inflatable article and an interior wall defining a reservoir, the inflatable article being a tire having a bead, the arrangement comprising:
   a component adapted to at least partially define an elongated chamber, the component being a part of the inflatable article or a part of an ancillary structure disposed in contact with the bead of the inflatable article, and
   an elongated member disposed in the chamber.

* * * * *